Feb. 18, 1947.  J. A. GUYER  2,416,003
HYDROCARBON CONVERSION PROCESS WITH SPECIAL ARRANGEMENT OF CATALYST
Filed Aug. 20, 1945
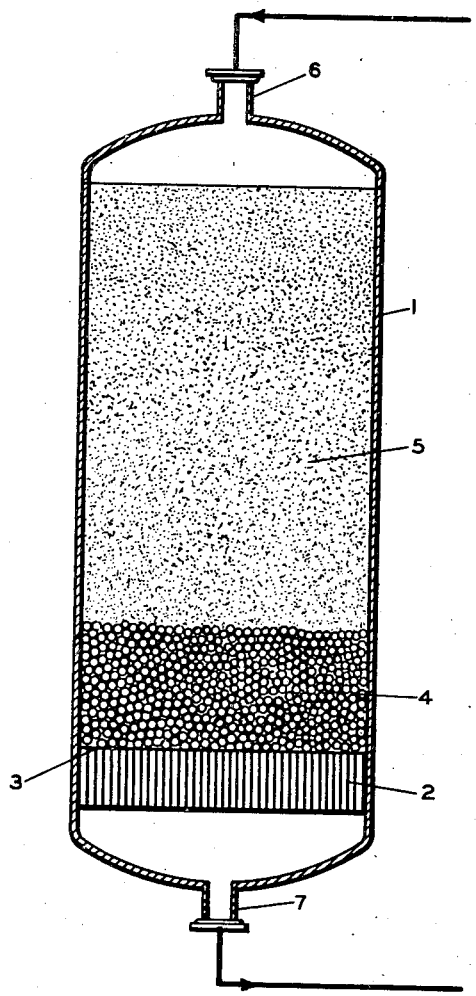
INVENTOR.
J.A.GUYER
BY *Hudson & Young*
ATTORNEYS Patented Feb. 18, 1947

2,416,003

UNITED STATES PATENT OFFICE 2,416,003

HYDROCARBON CONVERSION PROCESS WITH SPECIAL ARRANGEMENT OF CATALYST

Jesse A. Guyer, Bartlesville, Okla., assignor to Phillips Petroleum Company, a corporation of Delaware Application August 20, 1945, Serial No. 611,651

4 Claims. (Cl. 196—52)

1

The present invention relates to catalytic hydrocarbon conversion reactions and particularly to such reactions wherein solid catalytic material is disposed in suitable catalyst chambers in the form of stationary beds and wherein such beds are used alternately on-stream and in regeneration.

In the catalytic conversion of hydrocarbons by contact with catalyst in fixed beds in order to effect such conversion reactions as cracking, reforming, polymerization, dehydrogenation, etc., carbonaceous deposits are formed on the catalyst which progressively impair catalyst activity. Such deposits are combustible and in practice are usually removed periodically by contact with a regenerating or reactivating gas containing free oxygen at combustion temperatures. Such reactivating gases usually contain low concentrations of oxygen together with diluents such as steam or flue gas.

In fixed bed catalyst chambers catalyst is usually disposed within a closed chamber or reaction zone, having inlet and outlet means, and in which the catalyst is supported on screens, gratings, or other foraminous supports which have openings smaller than the catalyst particle size and which permit inlet or product gases to pass therethrough and through the catalyst bed.

Usually during reactivation of the catalyst, particularly where the catalyst has had substantial quantities of carbon deposited thereon during the conversion reaction, the combustion reaction proceeds in the form of a relatively narrow burning zone which moves progressively through the bed from one end to the other in the direction of flow of reactivating gas. This phenomenon is particularly characteristic where the carbon deposited is more than about one or two per cent by weight of the catalyst. In such cases it has been found that as each burning zone moves forward it leaves behind it a corresponding mass of reactivated catalyst at substantially the temperature of the preceding burning zone. Each mass of hot catalyst thus serves to preheat reactivating gas entering the next burning zone and then progressively raises the temperature of the reactivating gas which enters each successive burning zone. The result is that the temperature of the bed tends to rise progressively until

2 the last burning zone or increment of catalyst is at a maximum temperature. Thus in a catalyst chamber where the catalyst is supported by a screen or other means, and where the reactivating gas has been introduced at the opposite end, high temperatures and surface combustion will exist in contact with said supporting means. As a result such screens or other means will suffer damage and require frequent replacement. In vertical beds it is customary to support the catalyst in the manner described but to introduce fluids from the top in order to avoid the lifting effect of fluids introduced at the bottom which effect would cause displacement of the catalyst, attrition, etc.

It is, therefore, an object of the present invention to prevent or minimize injury to catalyst supporting members during reactivation of carbondeactivated catalyst.

It is a further object of the present invention to provide a novel arrangement of catalyst in a bed which will function to prevent or minimize injury to catalyst supporting means or adjacent members.

It is another object of the present invention to provide a process and apparatus which will prevent a high temperature regenerating zone from contacting catalyst supporting means.

In accordance with my invention the progress of the burning zone is stopped before it reaches catalyst support zone by replacing the section of the catalyst bed in contact with the support with a catalytic material which will promote an endothermic reaction such as the water gas reaction or the reaction between $CO_2$ and C to form CO. By inserting at the bottom of the bed a section of active catalyst of this type, and utilizing as a diluent in the reactivating gas, steam or flue gas containing substantial proportions of $CO_2$, as the burning zone progresses through the bed, hot products of combustion, also containing steam and/or $CO_2$, will contact the active water gas catalyst at the bottom of the bed and remove carbon therefrom by means of the endothermic water gas reaction or reaction of $CO_2$ with carbon. When the burning zone reaches the water gas catalyst section, it will have to stop since carbon sufficient to support combustion in the bottom of the bed will no longer be present. Also the endothermic nature of the reactions between steam and carbon or $CO_2$ and carbon will have served to keep the bottom of the bed at a temperature below burning zone temperature. The water gas catalyst selected will also possess a lower activity for hydrocarbon conversion so that the concentration of carbon deposited thereon will be less than is deposited on the conversion catalyst. Since the regeneration is preferably permitted to continue at temperatures of 1000–1600° F., depending on the thermal stability of the catalyst, the temperature of the gas reaching the water gas catalyst zone will be at a maximum and will be particularly conducive to an extent of reaction sufficient to prevent penetration of the burning zone and consequent reduction in temperature at the region in contact with the support. Preferably the water gas catalyst used should occupy a section at least equal in depth to that of a burning zone. Usually the burning zone is fairly well defined and varies from a few inches to about a foot in depth. Preferred catalysts which promote the reactions

$$H_2O + C \rightarrow CO + H_2 \text{ and } CO_2 C \rightarrow 2CO$$

includes $Fe_2O_3$, $CuO$, $Cr_2O_3$, $K_2O$, $MgO$, $MgCO_3$, ores such as brucite or magnesite, $K_2CO_3$, $NiCO_3$, $NiO$, metallic nickel, or any other active water gas catalyst. These catalysts may be utilized as such or deposited or impregnated on inert supports in varying proportions, usually ranging from 1 to 50 per cent of the total mass. The reactions between $H_2O$ and carbon and $CO_2$ and carbon are both considered to be water gas reactions since they both yield CO, are endothermic, and are promoted by the same catalysts. Whether the reactivation gas initially contains steam or $CO_2$ or not, the carbon will be removed from the water gas catalyst by reaction with $CO_2$ formed in the products of combustion.

The process and apparatus may be illustrated by reference to the drawing, in which 1 is a cylindrical catalyst chamber of any desired construction. The catalyst bed is supported by a metal grid 2 at the bottom of the chamber. To prevent the catalyst from passing through the grid an alloy metal screen 3 is placed on top of the metal grid. The water gas catalyst 4 or an inert material impregnated with a water gas catalyst is placed on top of the screen. This portion of the catalyst bed can vary in depth; however, one-half to two feet is recommended. The chamber is then filled with the regular process catalyst 5, which for example may be gas oil cracking catalyst. Such catalysts may include bauxite, silica-alumina, acid-treated clays, etc.

During the gas oil cracking process cycle the hot gas oil vapors enter through the top of the chamber at 6 and pass down through the catalyst bed. Gas oil vapors are catalytically cracked as they pass through the catalyst bed and deposit carbon on the catalyst surface. The gas oil vapors continue through the bed of water gas catalyst and also deposit carbon on its surface due to thermal cracking and probably some surface reactions although the catalyst 4 is not primarily a gas oil cracking catalyst. The cracked gas oil vapors leave the catalyst chamber through the gas outlet 7.

During the reactivation part of the cycle the gas oil vapors are discontinued and a mixture of reactivating gas and diluent such as steam and air is passed through the catalyst bed. The carbon deposited on and in the catalyst 5 burns in a relatively short burning zone which progresses through the catalyst bed as discussed above. The hot products of combustion mixed with the inert gas, which in our case is steam, promotes some water gas reactions in a zone preceding the actual combustion zone although the rate of this water gas reaction is not sufficient to remove all of the carbon from the surface of the cracking catalyst. As the hot products of combustion from the burning zone in the catalyst 5 pass through the catalyst bed 4 the rate of the water gas reaction is increased and by the time the actual zone reaches the bottom of the catalyst bed 3, all the carbon on the catalyst in bed 4 is removed by the water gas reactions; therefore, the burning zone is stopped before it contacts the metal screen.

The advantage of this catalyst bed arrangement is that the burning zone does not contact the screen or metal grid supporting the catalyst bed and thus the screen or grid is not subject to injury by high temperature.

*Example*

A catalyst bed is arranged with 300 pounds of magnesite in the form of a layer 4 inches in depth, placed on a grid in a catalyst chamber, having an internal diameter of 3 feet. On top of the magnesite are placed 2,000 pounds of a bauxite cracking catalyst. Cracking of a light gas oil is carried out at a temperature of 1050° F. until about 2 per cent by weight of carbon on the catalyst is deposited. At the end of the conversion reaction, therefore, the bauxite will carry 40 pounds of carbon. The magnesite, being a less effective cracking catalyst, will have only about 0.5 per cent carbon or 1.5 pounds. With an initial regenerating gas temperature of 800° F. the burning zone temperature will reach about 1300° F. using 150 cubic feet of air and 30 pounds of steam per hour for regeneration. The steam and combustion gas mixture entering the magnesite section of the bed will be about 1200° F. which is high enough to allow the water gas reaction to proceed effectively. Allowing the regeneration to proceed for two hours will permit 60 pounds of steam to contact the 1.5 pounds of carbon on the magnesite by the end of the regeneration reaction or by the time the burning zone has reached the end of the bauxite portion of the bed. This is more than sufficient to substantially completely remove carbon from the magnesite and the burning zone will stop at the end of the bauxite portion of the bed and will not proceed through the magnesite to contact the supporting grid. The temperature of the gas leaving the magnesite section of the bed during the regeneration is at all times substantially less than the burning zone temperature for this reason.

I claim:

1. In a process wherein hydrocarbons are converted by contact with a bed of conversion catalyst supported by a supporting member, and the catalyst is deactivated by deposition of carbonaceous material thereon, and wherein the catalyst is reactivated by combustion of the carbonaceous material by means of an oxygen-containing reactivation gas and wherein combustion of said carbonaceous material proceeds in the form of a burning zone moving from one end of the bed to the other in the direction of the supporting member, the method of preventing contact of the burning zone with said supporting member which comprises interposing between said conversion catalyst and said supporting member a layer of a water gas catalyst whereby endothermic reaction of carbon thereon takes place and progress of the burning zone ceases when it reaches said layer.

2. A process according to claim 1 wherein the reactivating gas contains steam as a diluent.

3. A process according to claim 1 wherein the reactivating gas comprises carbon dioxide.

4. A process according to claim 1 wherein hydrocarbons are catalytically cracked by contact with a bed of cracking catalyst.

JESSE A. GUYER.

REFERENCES CITED

The following references are of record in the file of this patent:

UNITED STATES PATENTS

| Number | Name | Date |
|---|---|---|
| 2,094,128 | Lazier et al. | Sept. 28, 1937 |
| 2,162,893 | Kuhl | June 20, 1939 |
| 2,271,617 | Benedict | Feb. 3, 1942 |
| 2,300,971 | Roberts et al. | Nov. 3, 1942 |
| 2,342,856 | Hall | Feb. 29, 1944 |
| 2,348,576 | Seguy | May 9, 1944 |